US011358305B2

(12) United States Patent
Pfaff

(10) Patent No.: US 11,358,305 B2
(45) Date of Patent: Jun. 14, 2022

(54) METHOD FOR PRODUCING A TEXTILE-REINFORCED CONSTRUCTION MATERIAL COMPONENT, AND TENSIONING DEVICE FOR SAME

(71) Applicant: Solidian GmbH, Albstadt (DE)

(72) Inventor: Johann Pfaff, Winterlingen (DE)

(73) Assignee: Solidian GmbH, Albstadt (DE)

( * ) Notice: Subject to any disclaimer, the term of this patent is extended or adjusted under 35 U.S.C. 154(b) by 534 days.

(21) Appl. No.: 16/015,499

(22) Filed: Jun. 22, 2018

(65) Prior Publication Data
US 2018/0370072 A1    Dec. 27, 2018

(30) Foreign Application Priority Data

Jun. 23, 2017  (EP) ..................... 17177675

(51) Int. Cl.
*B28B 23/02*    (2006.01)
*E04C 5/08*    (2006.01)
(Continued)

(52) U.S. Cl.
CPC ........ *B28B 23/024* (2013.01); *B28B 23/0006* (2013.01); *B28B 23/04* (2013.01);
(Continued)

(58) Field of Classification Search
None
See application file for complete search history.

(56) References Cited

U.S. PATENT DOCUMENTS

| 6,389,775 | B1 | 5/2002 | Steiner |   |
|---|---|---|---|---|
| 2011/0219721 | A1 * | 9/2011 | Densmore | E04C 5/20 52/687 |

(Continued)

FOREIGN PATENT DOCUMENTS

| CN | 202164745 U | 3/2012 |   |
|---|---|---|---|
| DE | 8903324 | * 5/1989 | ............... E04C 5/20 |

(Continued)

OTHER PUBLICATIONS

English translation of DE 8903324 (Year: 1989).*
(Continued)

*Primary Examiner* — Timothy Kennedy
*Assistant Examiner* — Olukorede Esan
(74) *Attorney, Agent, or Firm* — Fitch, Even, Tabin & Flannery LLP

(57) ABSTRACT

A method for producing a three-dimensional construction material component preferably having at least one curved surface. A plurality of spacers are arranged in a formwork. A textile reinforcement is supported on the spacers, such that the textile reinforcement has a defined position within a formwork interior of the formwork. A tensile force is applied via a tensioning device to the textile reinforcement in at least one tension direction. Construction material is introduced into the formwork interior and surrounds the textile reinforcement. The construction material is then hardened, wherein the tensile force is maintained during the hardening. During this process, the spacers are integrated into the construction material component. The tensioning device has at least one clamping unit for clamping an end portion of the textile reinforcement between two clamping surfaces. The clamping surfaces are provided on clamping insert bodies, which are of a plastic material of a defined hardness.

10 Claims, 6 Drawing Sheets

(51) Int. Cl.

| | |
|---|---|
| *E04C 5/12* | (2006.01) |
| *E04G 21/12* | (2006.01) |
| *B28B 23/00* | (2006.01) |
| *B28B 23/04* | (2006.01) |
| *B29C 70/54* | (2006.01) |
| *B29C 70/56* | (2006.01) |
| *E04B 1/16* | (2006.01) |
| *E04C 5/07* | (2006.01) |
| *B29K 9/06* | (2006.01) |
| *B29K 63/00* | (2006.01) |

(52) U.S. Cl.
CPC .......... *B29C 70/541* (2013.01); *B29C 70/543* (2013.01); *B29C 70/56* (2013.01); *E04B 1/166* (2013.01); *E04C 5/073* (2013.01); *E04C 5/085* (2013.01); *E04C 5/127* (2013.01); *E04G 21/12* (2013.01); *E04G 21/121* (2013.01); *B29K 2009/06* (2013.01); *B29K 2063/00* (2013.01)

(56) References Cited

U.S. PATENT DOCUMENTS

| | | | | |
|---|---|---|---|---|
| 2015/0267408 A1* | 9/2015 | Kurath-Grollmann | ... | E04B 1/16 52/223.6 |
| 2015/0345140 A1* | 12/2015 | Karle | ...... | B29C 39/10 52/782.1 |
| 2016/0222663 A1* | 8/2016 | Mauz | ...... | E04C 5/206 |

FOREIGN PATENT DOCUMENTS

| | | | | |
|---|---|---|---|---|
| DE | 102004033015 A1 | | 3/2005 | |
| DE | WO 2007019593 | * | 2/2007 | ............ E04C 2/06 |
| DE | 102005038541 A1 | | 3/2007 | |
| DE | WO 2015039869 | * | 3/2015 | ............ E04C 5/16 |
| EP | 1186730 A1 | | 3/2002 | |
| FR | 2644495 A3 | | 9/1990 | |
| KR | 20040079129 A | | 9/2004 | |
| WO | 2013113442 A1 | | 8/2013 | |
| WO | 2014040653 A1 | | 3/2014 | |

OTHER PUBLICATIONS

English Translation of WO 200701953 (Year: 2007).*
Extended European Search Report dated Jan. 5, 2018, for European Application No. 17177675.0 (7 pgs.).
Krüger, Markus, "Vorgespannter textilbewehrter Beton" ("Pre-stressed Textile-reinforced Concrete"), University of Stuttgart, 2004.
European First Office Action dated Jun. 18, 2021, in corresponding European Application No. 17177675.0, with English translation (26 pages).
United Arab Emirates Office Action and Search Report dated Oct. 19, 2021, issued in corresponding United Arab Emirates Application No. P6000843/2018 (9 pages).

* cited by examiner

METHOD FOR PRODUCING A TEXTILE-REINFORCED CONSTRUCTION MATERIAL COMPONENT, AND TENSIONING DEVICE FOR SAME

RELATED APPLICATION(S)

This application claims the benefit of European Patent Application No. 17177675.0, filed Jun. 23, 2017, the contents of which is incorporated herein by reference as if fully rewritten herein.

TECHNICAL FIELD

The invention relates to a method for producing a building product component or construction material component, provided with a textile reinforcement, for aboveground or underground construction, and a tensioning device for applying a tensile force to the textile reinforcement. The construction product component or construction material component can be a concrete component, a cement component, a mortar component, or another construction material component having a matrix formed of a construction material or construction product.

BACKGROUND

WO 2014/040653 A1 describes a method for producing a concrete component. A reinforcing element has a plurality of fibres. The fibres are held by holding elements and can be tensioned by means of the holding elements in the fibre longitudinal direction. The fibres can be carbon rovings. The tensioning of rovings for embedment in a concrete matrix of a concrete component is also known from the dissertation "Vorgespannter textilbewehrter Beton" ("Prestressed Textile-reinforced Concrete"), Markus Kruger, University of Stuttgart, 2004.

EP 1 186 730 A1 discloses a reinforcement formed of a flat band lamella having a plurality of supporting fibres. In order to be able to secure the flat band lamella to a component by means of a prestress, an anchoring tab is provided, which can be anchored to the component. The flat band lamella is fixedly bonded to the component whilst the tension is maintained.

In DE 10 2004 033 015 A1 a clamping holder for reinforcement rods with a circular cross-section is described. Clamping jaws are supported on an inner cone surface and in turn exert a clamping force in the radial direction onto the reinforcement rod. The reinforcement rods are cast into a concrete matrix in a hydraulically tensioned state.

In the method known from DE 10 2005 038 541 A1 planar load-bearing elements having a textile reinforcement are produced. Tubular cavities run through the hardened concrete component. A tension member is guided through this cavity and is tensioned with respect to the hardened concrete. The remaining cavity is then pressed around the tension member with epoxy resin. These concrete components can also have the form of a paraboloid or hyperboloid.

Prestressing a textile reinforcement and arranging it on a component in the prestressed state is known. In the case of planar components a method of this kind is possible without excessive effort. It is difficult if arbitrarily shaped three-dimensional concrete components are to be produced. DE 2005 038 541 A1 proposes firstly introducing pipes into the concrete component and then leaving the concrete to harden. Only once the concrete has hardened are individual tension elements then placed into the pipes, prestressed, and a composite with the pipes produced by epoxy resin. This method is very complex.

In addition, a textile reinforcement, in particular when it comprises resin-saturated rovings, is very sensitive to large radial clamping forces that are required to generate a prestress. The textile reinforcement can be damaged, and therefore a defined tensile force or prestressing force cannot be maintained. The object of the present invention is therefore to create an improved production method and an improved tensioning device which can be used in the production of a construction material component.

SUMMARY

This object is achieved by a method having the features of claim 1 and a tensioning device having the features of claim 15.

In the method, a formwork having at least one formwork part is provided. The formwork for example can consist of two formwork parts, which can be closed similarly to a mould, such that the delimited formwork interior defines the form of the construction material component to be produced. Since the construction material is not pressurised as it hardens, the formwork interior can be open upwardly.

Spacers are inserted into the formwork. The spacers preferably consist of the construction material also used for the construction material component, for example concrete or mortar. The composition of the construction material or construction product of the spacers can preferably correspond to the composition of the construction material or construction product of the construction material component to be produced. The spacers can also be made of plastic. The spacers remain in the produced construction material component.

A textile reinforcement has at least one textile strand, which for example can be formed by a roving. The textile reinforcement, when arranged at the spacers, can already be saturated with a resin, in particular a thermoset resin, and hardened, or saturated with a resin, in particular a thermoset resin, but not yet fully hardened, or saturated with a reversible cross-linked plastics material and cured, the form of which can be adjusted by bending or forming. The textile reinforcement obtains a form or shaping which, in a hardened state, in which the textile reinforcement is to be embedded in the construction material component, is adapted to the form of the construction material component to be produced. The textile reinforcement is arranged at the spacers. The position of the textile reinforcement within the formwork and thus within the construction material component to be produced is defined via the spacers.

The textile reinforcement, after having being arranged at the spacers, is acted on by a tensile force in at least one direction, in which the at least one textile strand extends. Here, the at least one textile strand does not have to extend linearly, and instead can be curved or bent in at least one region. The at least one textile strand of the textile reinforcement is supported, transversely to the direction of extent of the textile strand acted on by the tensile force, on the formwork or at least one formwork part of the formwork via the spacers. The position of the textile reinforcement within the formwork or the formwork interior is thus defined. Flowable construction material, such as concrete or mortar, is then filled into the formwork interior and hardened. As the construction material hardens, the tensile force on the textile reinforcement is maintained. Lastly, the hardened construction material component can be stripped, i.e. removed from the formwork.

The position of the textile reinforcement within the component to be produced can also be predefined by the use of spacers when the construction material component to be produced has an arbitrary three-dimensional shaping, for example is curved in a concave or convex manner in one or more spatial directions. The construction material component can thus be reinforced with the textile reinforcement within the construction material component at the desired point or in the desired region. Arbitrarily complex three-dimensional forms of the construction material component can be produced in principle with this method, in particular construction material components having one or more surfaces curved in a concave and/or convex manner. Nevertheless, the textile reinforcement can be embedded directly in the construction material matrix and can join to the construction material matrix in the prestressed state as it hardens.

It is advantageous if the spacers are placed by their underside on a lower formwork part. In this embodiment the spacers can be positioned in the formwork by the force of gravity, in particular without additional fixing. It is alternatively also possible to secure one or more of the spacers at the desired point in the formwork by a fixing means, before the textile reinforcement is arranged on the spacers and is tensioned by a tensile force.

In a preferred exemplary embodiment the spacers have an upper side, which is convexly curved in at least one direction of curvature. In particular, there is contact at the upper side between the relevant spacer and an associated portion of the at least one textile strand. The direction of curvature corresponds to the direction of extent of the at least one textile strand of the textile reinforcement acted on by tensile force. Due to the curved form of the upper side, the textile strand of the textile reinforcement or the roving that is under tension is not damaged. The curvature of the upper side in the direction of curvature can be greater, at least at one or more points, compared to the curvature of the at least one textile strand supported thereon.

In this embodiment it can also be advantageous if the upper side forms an indentation or channel transversely to the direction of curvature—i.e. transversely to the direction of extent of the at least one textile strand—so as to support the at least one textile strand.

It is advantageous if a plurality of the spacers are connected to one another by means of a pliable or flexible connection element. For example, a plurality of spacers can be arranged on a common connection element at a distance from one another and can form a chain. A chain of this kind can also be arranged on a lower formwork part by the force of gravity alone if the lower formwork part is not oriented horizontally over the entire length of the chain and for example has a convexly curved form.

It is preferred if the spacers form a plurality of groups, for example a plurality of the above-explained chains. The spacers within the same group are connected to one another by means of a pliable or flexible connection element. A plurality of chains can thus be provided by, in each case, a plurality of spacers. The number of the spacers per group or per chain can vary.

At least two of the provided spacers can have different sizes and/or contours depending on the form of the construction material component to be produced. All spacers are preferably identical, such that the production thereof is simplified.

In one exemplary embodiment of the method, the formwork can be produced in that a true-to-nature model of the construction material component to be produced is firstly produced. A hollow mould having two or more than two formwork parts is then produced on the basis of this model and is used as formwork.

The textile reinforcement is preferably formed by a plurality of textile strands. The textile strands can intersect one another and can be connected to one another at the points of intersection. In this way, a lattice structure of the textile reinforcement is created. The textile reinforcement can comprise one or more groups, each with at least one textile strand. The textile strands within a group are arranged without intersection and for example can extend parallel to one another. Two different groups can be arranged in such a way that their textile strands intersect one another. The number of groups of textile strands is arbitrary. In one exemplary embodiment a textile reinforcement comprises one or two groups of textile strands.

A textile strand can be produced for example by saturating a roving with a resin, preferably a thermosetting resin, and by hardening. As the roving is hardened, textile strands can be connected to one another, whereby the lattice structure can be produced, for example.

In one exemplary embodiment of the method, the textile reinforcement can be hardened in a shaping or form in which the textile reinforcement is cast into the construction material component. This preformed and hardened textile reinforcement can be arranged on the spacers and acted on by the tensile force.

Alternatively, it is also possible to arrange a textile reinforcement that has not yet hardened on the spacers and to harden it there in the desired form. A tensile force can be exerted onto the textile reinforcement during or after the hardening.

The magnitude of the tensile force that is exerted onto the textile strands within the same group and/or all groups is preferably the same. The tensile force on textile strands of different groups is preferably produced and/or adjusted separately. The direction in which the tensile force is exerted onto each textile strand corresponds to the direction of extent or the running direction of said textile strands respectively. The tensile forces that are exerted onto different groups of textile strands can therefore prestress the text reinforcement in different directions. A lattice-like textile reinforcement can be pre-tensioned by the tensile forces, for example in two directions.

A tensioning device according to the invention can be used to generate the tensile force when the construction material component is produced. The tensioning device is designed to exert a tensile force onto a textile reinforcement in a tension direction. Here, the tensile force corresponds to the direction of extent or running direction of a particular textile strand of the textile reinforcement onto which the tensile force is exerted. The tensile force is preferably introduced at the opposite ends of the particular textile strand of the textile reinforcement.

The tensioning device comprises at least one clamping unit, which is designed to apply a clamping force to an end portion of the textile reinforcement. The clamping force acts in a clamping direction substantially at right angles to the direction of extent of the textile strands of the textile reinforcement acted on in a clamping manner. The at least one clamping unit has two clamping parts. Each clamping part has a clamping insert body. Each of the clamping insert bodies has a clamping surface, which bears directly against the end portion of the textile reinforcement to be clamped when the textile reinforcement is clamped in the clamping unit. Each clamping insert body or at least the clamping surface of each clamping insert body consists of a plastics material which, at the clamping surface, has a hardness in the range of from 55 Shore D to 80 Shore D.

It has been found that clamping insert bodies with a hardness of this kind on the one hand can exert a sufficiently great clamping force onto the end portion of the textile reinforcement and on the other hand prevent the textile strands from being damaged in the end portion. In addition, it is achieved that a very precise and uniform setting of the tensile force is possible via the clamping force between the two clamping parts or between the two clamping surfaces. The greater is the clamping force, the greater is the tensile force that can be applied to the textile reinforcement. If the tensile force on individual textile strands of the textile reinforcement is too great, the defined hardness of the plastics material of the clamping insert bodies enables a sliding relative movement between the textile strand in question and the clamping insert body, so that a uniform tensile force can be achieved on all textile strands clamped by the clamping force, depending on the generated clamping force between the clamping insert bodies. It is thus ensured that the magnitudes of the tensile forces on the textile strands of the textile reinforcement are the same and that the produced construction material component has a defined tensile stability.

It is preferred if at least one of the clamping insert bodies has an uneven clamping surface. Here, an uneven clamping surface is understood to mean a clamping surface which has protrusions and/or depressions, the dimension of which is greater than the roughness of the plastics material.

In a preferred exemplary embodiment the at least one uneven clamping surface has channels or grooves which extend in a transverse direction transversely to the tension direction. For example, the other clamping surface of the common clamping unit can be flat.

It is advantageous if each clamping part has a supporting protrusion which extends in the transverse direction transversely to the tension direction. The clamping insert can be supported on the supporting protrusion and is held on the clamping part against the tensile force.

It is preferred if the plastics material of the clamping insert body comprises a polyurethane resin with at least one additional material or additive. The at least one additional material or the at least one additive can be, for example, a filler and/or an isocyanate and/or a deaerator, in particular a silicone-free deaerator.

In one exemplary embodiment the plastics material comprises 15-25% by weight of a polyurethane resin, 45-55% by weight of an isocyanate, 20-35% by weight of a filler, in particular a quartz sand, and 0.5-1.5% by weight of a silicone-free deaerator, for example BYK-A535.

BRIEF DESCRIPTION OF THE DRAWINGS

Advantageous embodiments of the invention will become clear from the dependent claims, the description, and the drawings. Preferred exemplary embodiments of the invention will be explained in detail hereinafter on the basis of the accompanying drawings, in which:

DETAILED DESCRIPTION

Figure 1:
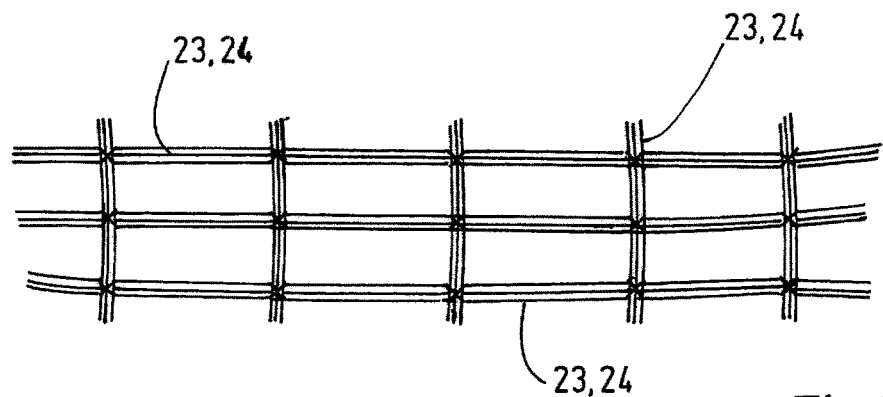
FIG. 1 shows a schematic illustration of a plurality of textile strands or rovings arranged in a lattice-like manner.
Figure 2:
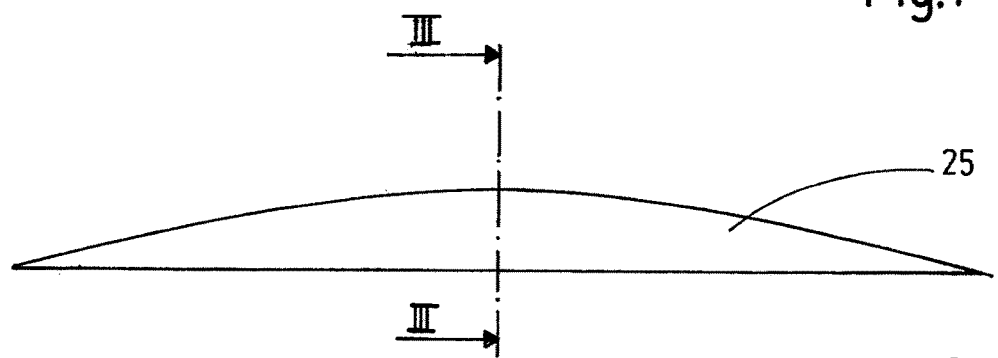
FIG. 2 shows a schematic side view of a mould part for shaping a textile reinforcement.
Figure 3:
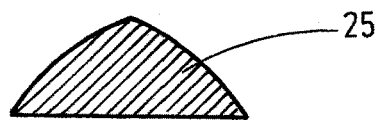
FIG. 3 shows a cross-sectional view of the mould part from FIG. 2 along line of section III-III.
Figure 4:
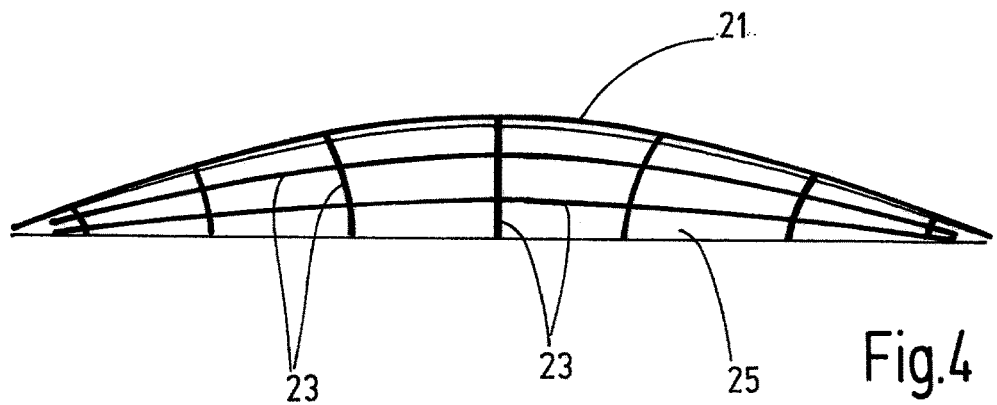
FIG. 4 shows a schematic side view for producing a shaping of the textile reinforcement predefined by the mould part.

A method for producing a construction product component or construction material component 20 with a textile reinforcement 21 (FIG. 12) will be explained on the basis of FIGS. 1-15. The construction product component or construction material component can be a concrete component, a mortar component, comprising cement or polymer or synthetic resin mortar, or a another construction material component having a matrix formed of a construction material or construction product.

The produced construction material component 20 can have an arbitrary three-dimensional shaping and for example can have at least one convexly curved and/or concavely curved surface. In the exemplary embodiment depicted here, a construction material component 20 is produced, one surface 20a of which, in accordance with the example, extends along a plane, whereas adjoining surfaces 20b are curved in a convex and/or concave manner. The construction material component 20 extends for example in a direction from one end 20c to an opposite end 20d. In the middle between the two ends 20c, 20d, the component has its greatest width and height and tapers from there in the direction of the respective ends 20c, 20d. The form of the construction material component 20 is also given on the basis of the model 22 shown in FIGS. 5-7. The form of the produced construction material component 20 is merely exemplary. Any other three-dimensional forms can be produced with the described method.

The textile reinforcement 21 has a plurality of textile strands 23. Each textile strand 23 can contain a roving 24 or can be formed by a roving 24. In FIG. 1 the textile strands 23 or rovings 24 within the same group run in a manner not intersecting one another, for example run in one direction, wherein the groups are preferably oriented at right angles to one another, such that the shown lattice structure is created. The textile strands 23 or rovings 24 are not yet saturated with a plastics material or a resin and are therefore still flexible. At the points of intersection, the rovings 24 are initially connected to one another or fixed to one another in a preliminary manner.

In order to produce a hardened textile reinforcement 21 in a desired three-dimensional shaping suitable for the relevant construction material component 20, a mould part 25 can be used for example, on which the textile reinforcement 21, which is not yet hardened, is arranged and then hardened. For example, the rovings 24 can be saturated with plastics material or resin, arranged on the mould part 25, and hardened in the form predefined thereby, for example in a furnace by the action of heat. This results in a hardened textile reinforcement 21, as is shown schematically in FIG. 4. The textile reinforcement 21 is dimensionally stable in the hardened state and can no longer be formed when the hardened resin is a thermoset. Epoxy resin or SPR (styrene butadiene rubber) can be used as material for the plastics matrix of the textile strands 23.

Figure 5:
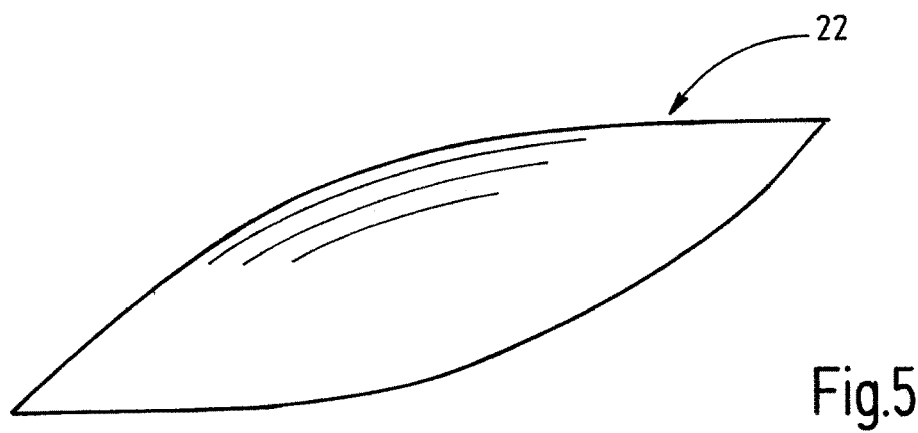
FIG. 5 shows a schematic, perspective view of a model of a construction material component to be produced.
Figure 6:
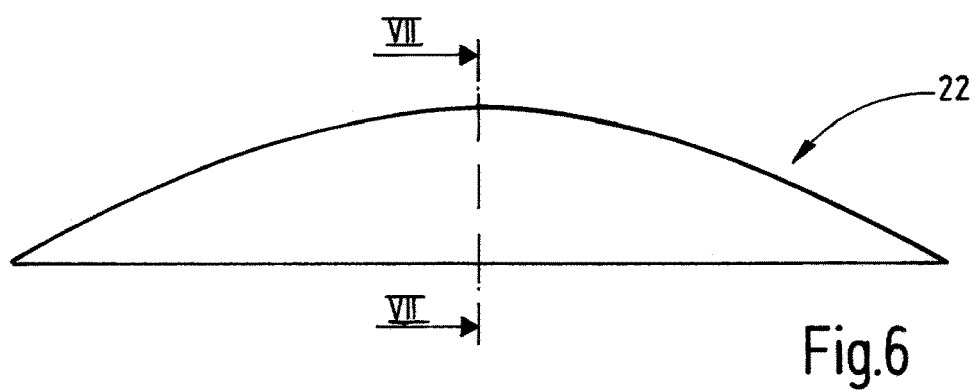
FIG. 6 shows the model from FIG. 5 in a side view.
Figure 7:
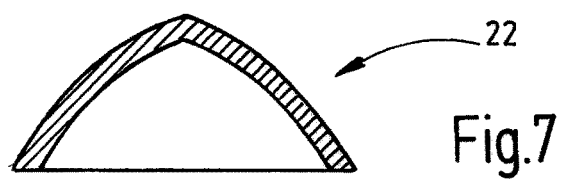
FIG. 7 shows the model from FIGS. 5 and 6 in a cross-section along line of section VII-VII in FIG. 6.
Figure 8:
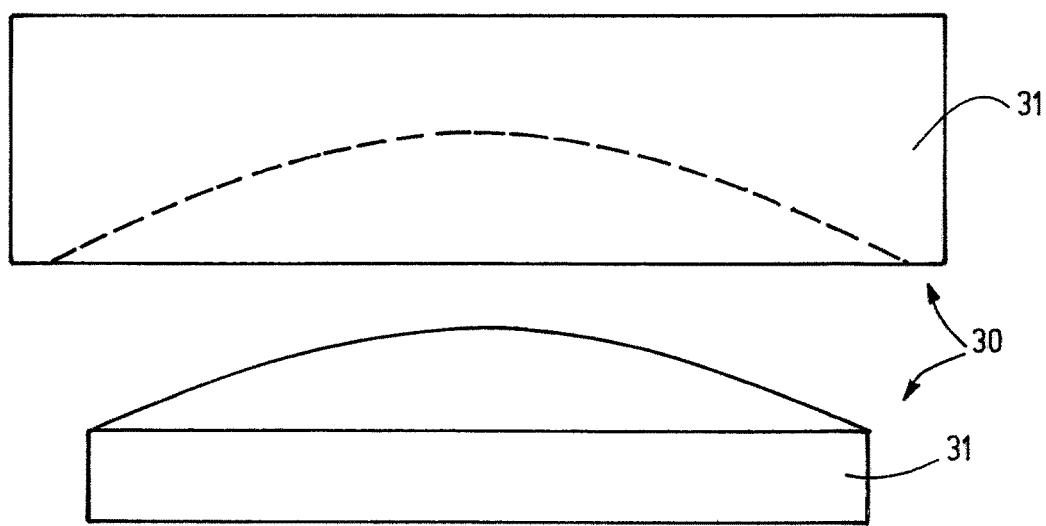
FIG. 8 shows a schematic view of an exemplary embodiment of a formwork with two formwork parts for producing a construction material component.

In order to be able to cast the construction material component 20 in the desired form, a formwork 30 is provided or produced. In the exemplary embodiment of the method described here, a model 24 on a 1:1 scale of the construction material component 20 to be produced is firstly created in order to produce the formwork 30. The model 22, the form and dimensions of which correspond to the construction material component 20 to be produced, is shown in FIGS. 5-7. By means of this model 22, a hollow mould is produced, which is used as formwork 30 (FIG. 8). The formwork 30 in particular comprises a plurality of formwork parts 31. In the exemplary embodiments illustrated schematically here, two formwork parts 31 are used. It is understood that more than two formwork parts 31 can also form a formwork 30. The number of formwork parts 31 is dependent in particular on the complexity of the shaping or form of the construction material component 20 to be produced.

Figure 9:
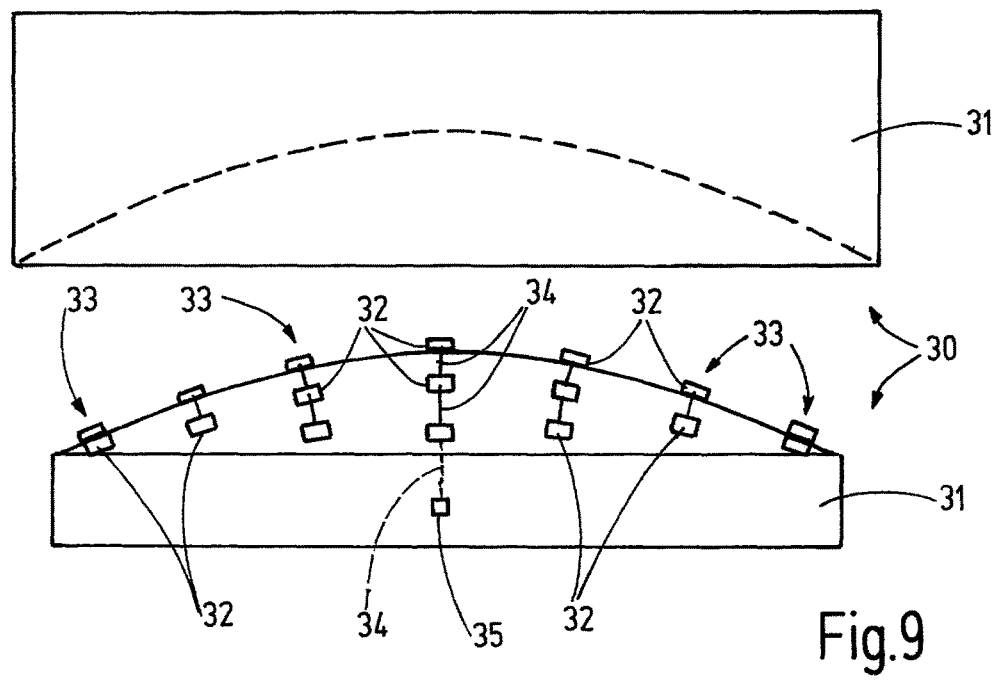
FIG. 9 shows the arrangement of a plurality of spacers in the formwork according to FIG. 8 in a schematic illustration.

In order to be able to arrange the textile reinforcement 21 in the formwork 30 in the intended, desired position, a plurality of spacers 32 are arranged in the formwork 30. The spacers 32 define the distance of the textile reinforcement 21 from at least one of the formwork parts 31 and consequently the position of the textile reinforcement 21 within the construction material component 20, when the interior of the formwork 30 is filled with the construction material (concrete, mortar or a suitable flowable and hardenable construction material). The spacers 32 are illustrated in FIG. 9 merely in a heavily schematised manner. A plurality of spacers 32 preferably form a common group 33. The number of spacers 32 per group 33 can be the same or different. All spacers 32 within the same group 33 are preferably connected to one another, in particular by a pliable or formable or flexible connection element 34. The spacers 32 of the group 33 can be lined up on this connection element 34 at a distance from one another, so that each group 33 forms a chain. It is understood that each group 33 can also comprise a plurality of separate connection elements 34, wherein a connection element extends for example in each case between two directly adjacent spacers 32 and connects these two spacers 32 to one another. It is preferred if a connection element 34 extends through all spacers 32, so that one connection element 34 per spacer group can be sufficient.

Figure 13:
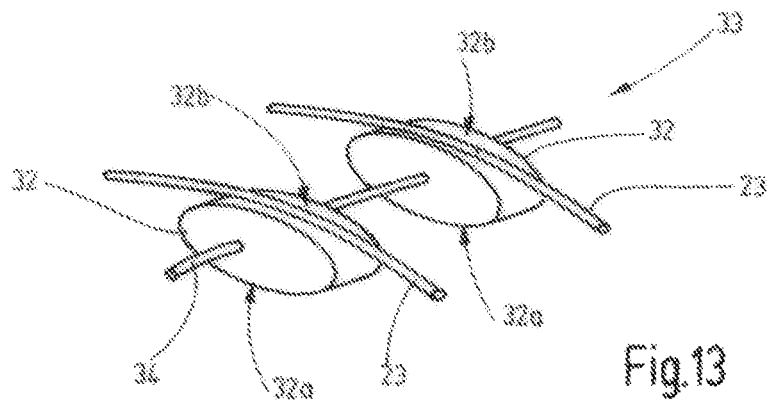
Figure 14:
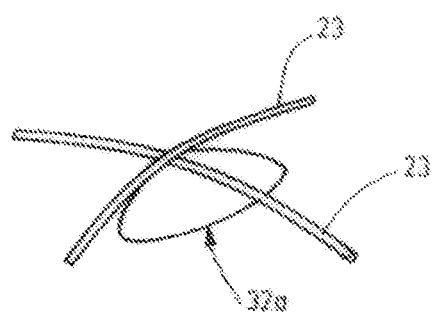
Figure 15:
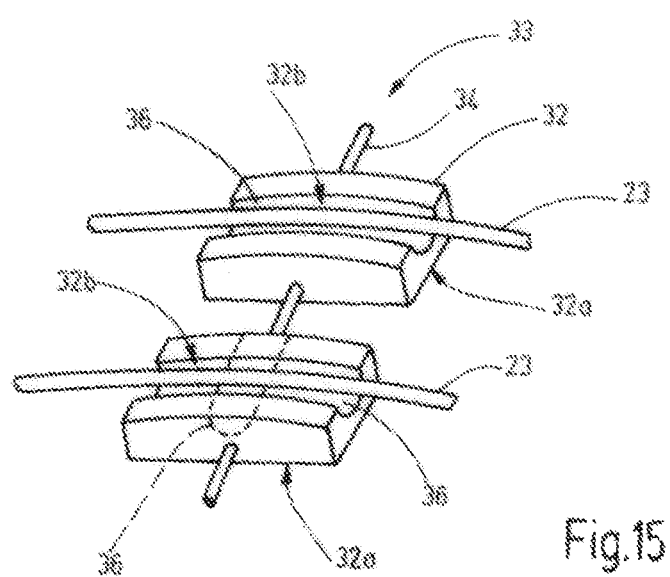

Different exemplary embodiments of spacers 32 are shown in FIGS. 13 to 15. Each spacer 32 has an underside 32a and an upper side 32b. The spacer 32 is arranged by means of the underside 32a on a formwork part 31 of the formwork 30 and bears preferably directly against the formwork part 31 via said underside 32a. The upper side 32b, opposite the underside 32a, is used as a supporting surface for a portion or a region of the textile reinforcement 21 or one or more textile strands 23. The upper side 32b is preferably convexly curved in at least one direction and is formed without edges and/or without steps at least in the portion used as a supporting surface. Damage to the textile reinforcement 21 is thus avoided.

The upper side 32b in the exemplary embodiment in FIG. 13 is curved in a single spatial direction, which can be referred to as the direction of curvature. Considered in a side view, the exemplary embodiment of the spacer 32 according to FIG. 13 has an elliptical or an ellipsoidal shaping. The underside 32a is thus also curved. The supporting surface of the underside 32a of the spacer 32 resting against a surface of the formwork part 31 is thus reduced. Construction material poured into the formwork 30 can therefore flow between the formwork part 30 and the spacer 32 and can surround the spacer 32 on all sides.

The upper side 32b of the exemplary embodiment of the spacer 32 shown in FIG. 14 is convexly curved in two directions of curvature and for example can have the form of a spherical Outer surface. The underside 32a is formed flat in the exemplary embodiment of the spacer 32 from FIG. 14. The spacer 32 according to FIG. 14 thus has the form of a spherical cap on the whole. The underside 32a can alternatively also have a different, arbitrary profile.

The exemplary embodiments according to FIGS. 13 and 14 could also be combined with one another. For example, the underside 32a in the case of the spacer body 32 from FIG. 13 could thus likewise be flat, or conversely the underside 32a in the exemplary embodiment shown in FIG. 14 could be convexly curved at least in one spatial direction.

In FIG. 15 a further exemplary embodiment of a spacer 32 is shown schematically. The upper side 32b curved convexly in one direction is in this exemplary embodiment formed in a concave manner in another direction transversely thereto, so that a channel 36 is formed, the base or bottom of which runs in one direction in a convexly curved manner. In a direction transversely thereto, a textile strand 23 can be supported or guided by the flanks of the channel. The underside 32a of this spacer 32 can be formed flat for example, alternatively can be convexly curved in at least one spatial direction.

If, in the exemplary embodiment of the spacer 21 shown in FIG. 15 not only one textile strand 23 is to be guided, but instead a plurality of textile strands 23, a plurality of channels 36 can be provided accordingly. If intersecting textile strands 32 are to be guided, a further channel intersecting the provided channel 36 can be provided in the region of the upper side 32b of the spacer 32, in addition to the shown and described channel 36. The course of a further channel 36 of this kind is shown in a dashed manner in FIG. 15.

The size, form or contour of the spacers 32 can vary depending on the shaping of the construction material component 20 to be produced. Spacers 32 having a different form or shaping at different points in the formwork 13 can also be used. All embodiments of the spacers 32 can be used jointly with further spacers 32 of the same or another exemplary embodiment in the production of a construction material component 20 and/or in different spacer groups or the same spacer group.

The spacers 32 in accordance with the example consist of a construction material and in particular have the same composition as the construction material from which the construction material component 20 is made. Alternatively, they can also be produced from a material different from the construction material matrix of the construction material component 20, for example from a plastics material, such as a resin or a polymer. The spacers 32, as will be explained in greater detail hereinafter, are cast into the construction material component 20. If the spacers 32 are connected to one another by means of connection elements 34, the connection elements 34 are also cast into the construction material component 20.

If the spacers 32 are connected via the connection element 34 to form one or more groups 33, these groups can also be arranged on a convexly curved surface of a formwork part 31 without additional further fixing, as shown schematically in FIG. 9. The forming of groups 34 therefore simplifies the arrangement of the spacers 32 in the formwork 30.

Should it not be possible to arrange the spacers 32 on a formwork part 31 solely by the force of gravity on account of the construction material component 20 that is to be produced, additional fixing means can also be used in order to fix the spacers 32 in the formwork 30 in the desired position. For example, the connection element 34 can also be used for the fixing 35 of the spacers 32. As appropriate, the connection element 34 can extend out from the cavity of the formwork 30 that is to be filled and can be fixed or secured there for positioning of the corresponding group 33 of the spacers 32. A fixing 35 for fixing a connection element 34 is shown by way of example in FIG. 9 in a heavily schematised manner.

The textile reinforcement 21 is arranged on the spacers 32. In the exemplary embodiment described here, the textile reinforcement 21 is hardened and consequently dimensionally stable. Alternatively to the described method, it could also be hardened if the form of the textile reinforcement 31 is predefined by the arrangement on or at the spacers 32.

A tensile force FZ on the textile reinforcement 21 is exerted onto the textile reinforcement 21 in at least one tension direction Z by means of a tensioning device 40. The tensile force FZ acts on one or more textile strands 23 of the textile reinforcement 21 along the particular extent thereof, wherein the tension direction Z corresponds to the running direction or direction of extent of the textile strand 23 acted on by the tensile force FZ. Textile strands 23 of one or more groups can be acted on by a tensile force FZ. In order to generate a tensile force FZ on one or more textile strands 23 within the same group, the ends of the textile strands 23 forming a particular end portion of the textile reinforcement 21 are each clamped and held by a clamping unit 41 of the tensioning device 40. The tensioning device 40 can exert the tensile force FZ onto the textile reinforcement 21 via the clamping units 41.

When the textile reinforcement 21 is acted on with a tensile force FZ by means of the tensioning device 40, the textile strands 23 can be shifted from their desired position transversely to the direction of the tensile force FZ depending on the three-dimensional form of the formwork 30. This can occur when the textile strands under tensile stress FZ are not connected to one another by a sufficient number of textile strands 23 running transversely thereto. In order to prevent a shifting of this kind, a fixing arrangement 37 can optionally be used, which holds the textile strands 23 in their desired orientation transversely to the applied tensile force FZ. For example, the connection points of the lattice-like textile reinforcement can be secured additionally by means of the fixing arrangement 37, for example by additional windings with fixing threads and/or additional adhesive securing points. Additionally or alternatively, the fixing arrangement 37 can have at least one additional fixing textile strand 38, which connects a plurality of textile strands 23 to one another transversely to the direction of the tensile force FZ and thus contributes to the fixing in position, additionally to the provided textile strands 23 running transversely to the tensile force FZ. The at least one fixing textile strand 38, similarly to the textile strands 23, can comprise a roving with a hardened plastics matrix formed from epoxy resin or SPR (styrene butadiene rubber).

Figure 10:
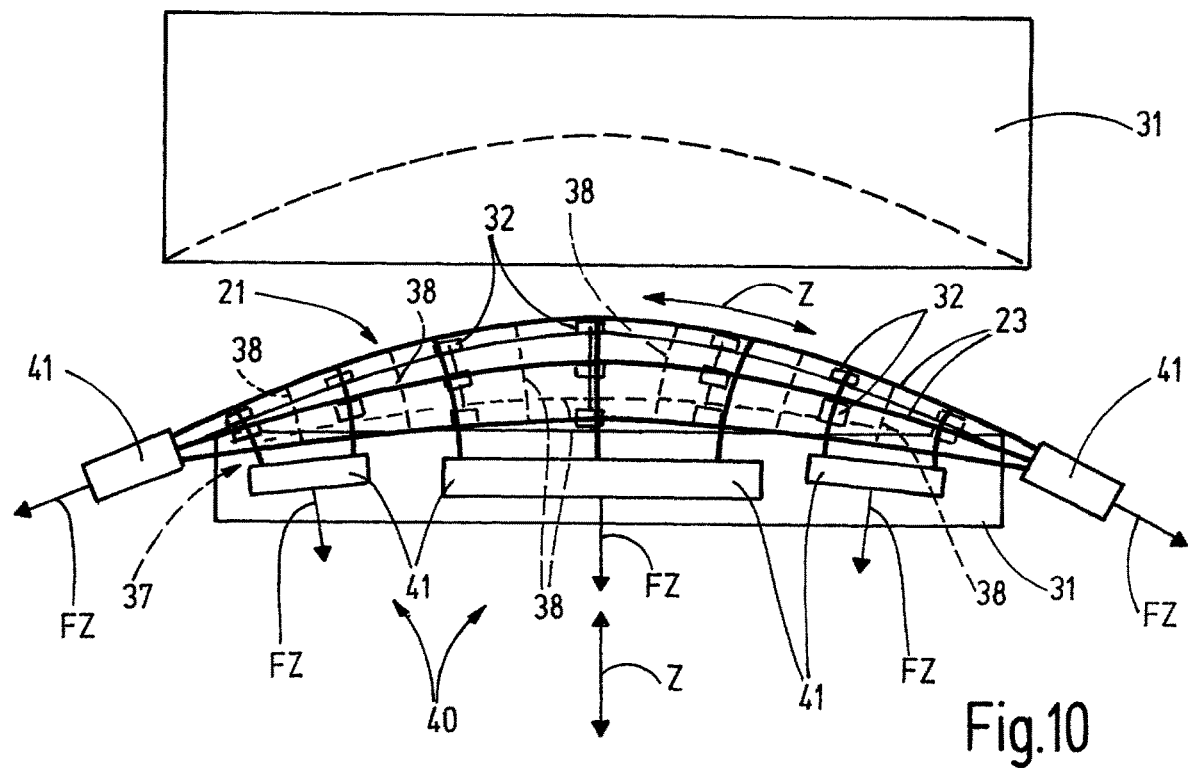
FIG. 10 shows the arrangement of a textile reinforcement on the spacers and the application of a tensile force to the textile reinforcement in a schematic illustration.
Figure 11:
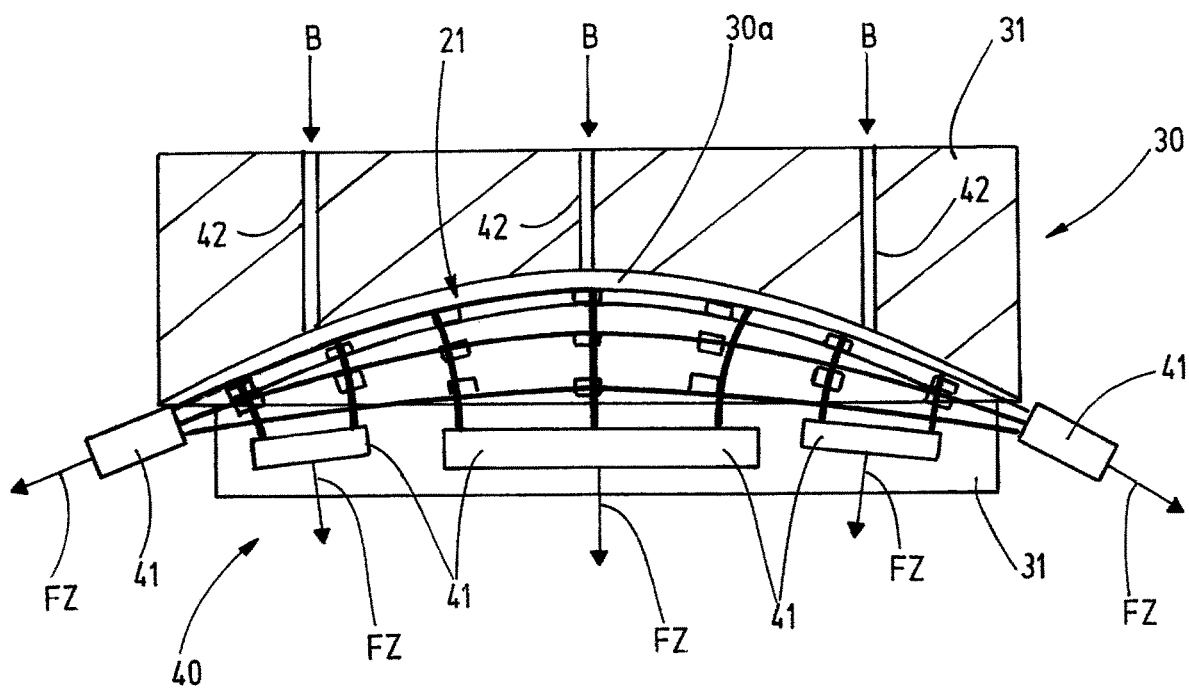
FIG. 11 shows the casting of the construction material component with closed formwork in a schematic illustration.
Figure 12:
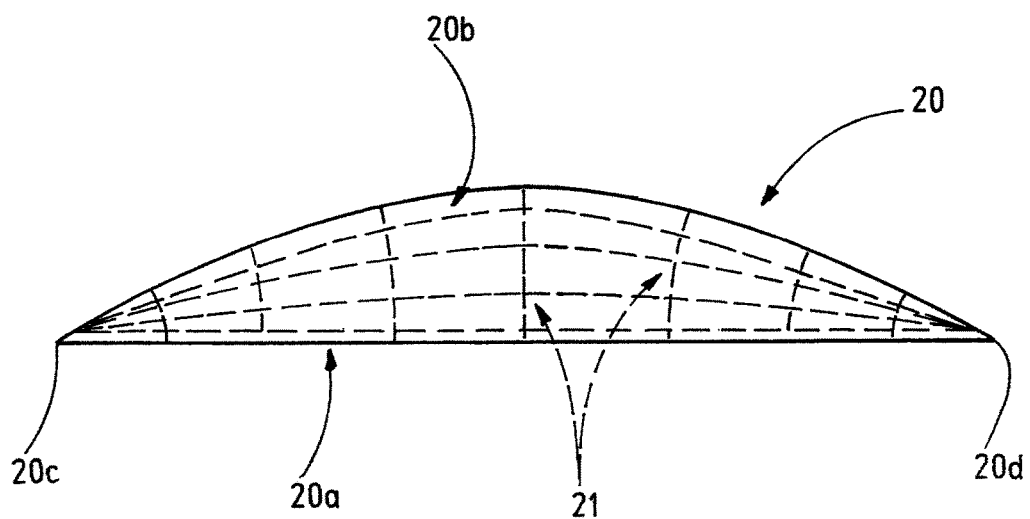
FIG. 12 shows a schematic side view of the stripped, produced construction material component with embedded textile reinforcement, FIGS. 13 to 15 each show a schematic illustration of different exemplary embodiments of spacers in a schematic perspective illustration.

In FIGS. 10 and 11 it is shown by way of example that the tensioning device 40 can be designed in such a way that the tensile force FZ can be exerted onto the textile reinforcement 21 in different directions Z. The number of clamping units 41 can vary here depending on the number of textile strands 32 and/or the size of the textile reinforcement 21.

As is shown in FIGS. 10 and 11, the tensile force FZ is exerted onto the textile strands 23 of the textile reinforcement 21, wherein the textile reinforcement 21 does not extend within a plane, but instead is bent or curved in accordance with the form of the construction material component 20 to be produced. The tensioning device 40 is located outside a formwork interior 30a of the formwork 30 to be filled with flowable construction material B. The formwork interior 30a of the formwork 30 is closed in such a way that a filled flowable construction material cannot flow out from the formwork interior 30a. The formwork interior 30a is defined by the formwork parts 31. At the points at which the textile reinforcement 21 protrudes from the formwork interior 30a, the formwork must be sealed off as appropriate. The formwork 30 can also be oriented in such a way that the open portions of the formwork interior 30a point upwards vertically, so that filled flowable construction material B cannot flow out from the formwork interior 30a. In order to fill the flowable construction material B into the formwork interior 30a of the formwork 30, at least one filling channel 42 can be used for example, which opens out into the formwork interior 30a of the formwork 30. The filling channel 42 can pass through a corresponding formwork part 31 and open out outwardly in order to be able to fill construction material B.

The construction material B hardens in the formwork 30 whilst the tensile force FZ is maintained. Once the construction material B has hardened, the generation of the tensile force FZ by the tensioning device 40 can be cancelled and the finished construction material component 20 can be removed from the formwork 30 (stripping). The finished construction material component 20 with the textile reinforcement 21 embedded therein is shown schematically in FIG. 12.

Figure 17:
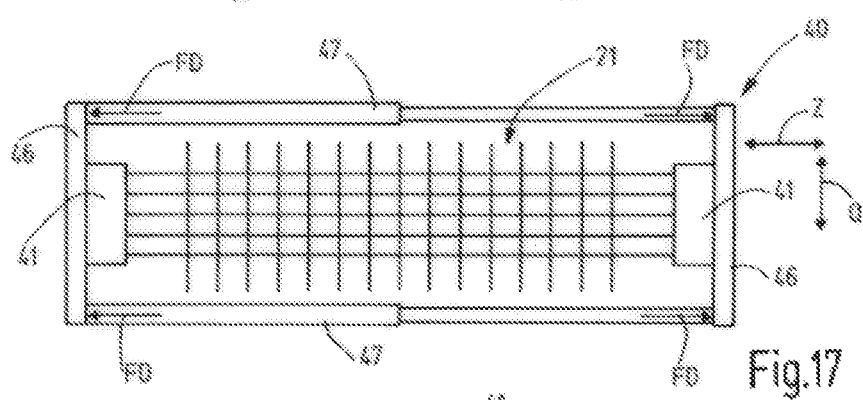
FIG. 17 shows a schematic illustration of an exemplary embodiment of a tensioning device having two clamping units.

FIG. 17 shows a heavily simplified schematic illustration of an exemplary embodiment of a tensioning device 40 with two clamping units 41. The two clamping units 41 each act on an opposite end portion of a textile reinforcement 21. Each clamping unit 41 is arranged on a supporting part 46. At least one force-generating device 47 is arranged between the two supporting parts 46 and acts on the two supporting parts 46 away from one another with a compressive force FD corresponding to the tensile force FZ. The compressive force FD forces the supporting parts 46 and consequently the clamping units 41 away from one another. A corresponding tensile force FZ is thus exerted onto the textile reinforcement 21.

In accordance with the example, the force-generating device 47 is formed by a length-variable telescope device. Force-generating devices 47 are preferably arranged one on each of the two sides of the textile reinforcement 21 in order to generate the tensile force FZ uniformly in a transverse direction Q, at right angles to the tension direction Z.

Figure 18:
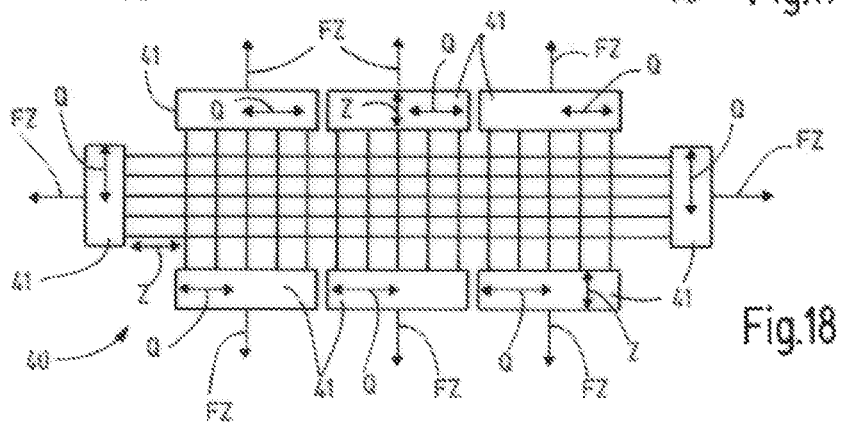
FIG. 18 shows the application of tensile forces in a plurality of spatial directions with the aid of a plurality of clamping units in a schematic illustration.

In the embodiment of the tensioning device 40 shown in FIG. 17 the tensile force FZ is generated merely in a tension direction Z. However, it is also possible to act on the textile reinforcement 21 with a tensile force FZ in a tension direction Z and with a further tensile force FZ in a further tension direction Z, for example in the directions in which the respective textile strands 23 of a lattice-like textile reinforcement 21 extend. This situation is schematically shown again in FIG. 18 by way of example. Here, the force can be generated between each two mutually opposed clamping units 41 in the manner described in conjunction with FIG. 17. It is also possible to generate the tensile forces FZ by any other force-generating device which can operate mechanically and/or electrically and/or hydraulically and/or pneumatically. For example, hydraulic cylinders, pneumatic cylinders, electric motors or the like can be used in order to generate a particular tensile force FZ.

Figure 16:
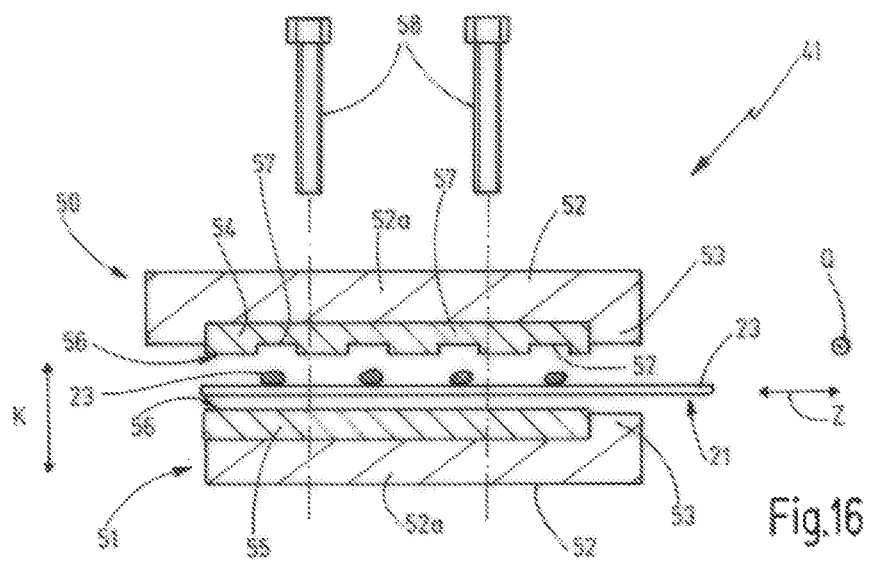
FIG. 16 shows a schematic cross-sectional view of an exemplary embodiment of a clamping unit of a tensioning device.

An embodiment of the clamping unit 41 formed in accordance with the invention is shown schematically on the basis of an exemplary embodiment in FIG. 16. The clamping unit 41 has a first clamping part 50 and a second clamping part 51. Each of the clamping parts 50, 51 has a carrier part 52 made of a hard material, for example steel. Each carrier part 52 has a plate portion 52a. The plate portion 52a is preferably cuboidal. A supporting protrusion 53 protrudes away at an incline or right angle to the plate portion 52a. The supporting protrusion 53 extends in a transverse direction Q at right angles to the tension direction Z of the tensile force FZ that is to be exerted onto the textile reinforcement 21 via the clamping unit 41. The transverse direction Q is oriented perpendicularly to the drawing plane in the image according to FIG. 16.

The first clamping part 50 has a first clamping insert body 54, and the second clamping part 51 has a second clamping insert body 55. The clamping insert bodies 54, 55 are produced from a plastics material. The plastics material has a hardness in the range of from 55 Shore D to 80 Shore D, preferably from 60 Shore D to 75 Shore D, more preferably 60 Shore D to approximately 70 Shore D, and for example from approximately 63 Shore D to approximately 67 Shore D. The plastics material in the exemplary embodiment consists of a polyurethane resin with at least one additional material. For example, the polyurethane resin can be mixed with an isocyanate and/or a filler, such as quartz sand, and/or an additive, such as a silicone-free deaerator. In a preferred exemplary embodiment the mixing ratio is approximately 19-21% by weight polyurethane resin, approximately 50-52% by weight isocyanate, approximately 27-29% by weight of a filler consisting of solid particles or grains, for example quartz sand, and approximately 0.5-1.5% by weight of a deaerator.

Each clamping insert body 54, 55 has a clamping surface 56, which points away from the carrier part 52 or the plate part 52a. The two clamping surfaces 56 of the two clamping insert bodies 54, 55 face towards one another. The clamping surfaces 56 extend in a plane spanned by the tension direction Z and the transverse direction Q.

The clamping surface 56 of the second clamping insert body 55 is flat apart from its roughness. The clamping surface 56 of the first clamping insert body 54 is divided by a plurality of grooves or channels 57 extending in the transverse direction Q into a plurality of portions which are completely separated from one another in the exemplary embodiment. The grooves 57 can each be assigned to a textile strand 23, which extends in the transverse direction Q in the end portion of the textile reinforcement 21 that is to be clamped between the two clamping surfaces 56. It is thus achieved that the textile strands 23 extending in the tension direction Z in the end portion of the textile reinforcement 21 to be clamped can be clamped sufficiently well between the mutually opposed clamping surfaces 56.

The clamping insert bodies 54, 55 are supported in the tension direction Z on the corresponding supporting protrusion 53. They are supported in the tension direction Z by the supporting protrusions 53 as the tensile force FZ is applied. Two clamping units 41 arranged in the tension direction Z on opposite sides of the textile reinforcement 21 have their supporting protrusions 53 on sides facing one another.

In order to generate a clamping force between the two clamping parts 50, 51, a screw connection comprising at least one and preferably a plurality of screws 58 can be used. The two clamping parts 50, 51 can be screwed to one another by means of the screws 58, so that a clamping force is exerted in a clamping direction K, at right angles to the direction of extent of the clamping surfaces 56, onto an end portion of the textile reinforcement 21 located between the two clamping surfaces 56. The clamping direction K is oriented at right angles to the transverse direction Q and to the tension direction Z.

Due to the defined hardness of the plastics material, a very defined hardness of the plastics material can be generated in the tensile direction Z. The textile strands 23 extending in the tension direction Z have the possibility to slide relative to the clamping surfaces 56 at a defined clamping force, until the tensile force FZ corresponds to a value predefined by the clamping force. If individual textile strands 23 are acted on by a tensile force FZ that is too high, these can also move relative to the clamping body inserts 54, 55 in the tension direction Z, until the tensile force FZ corresponds to a predefined value. On account of the used plastics material with defined hardness, the textile strands 23 in the clamped end portion are not damaged and the tensile force FZ can be maintained during the hardening of the concrete with the defined, desired magnitude. A uniform, very precisely adjustable tensile force FZ can therefore be generated on the textile strands 23 of the textile reinforcement 21 by means of the clamping unit 41 according to the invention.

The invention relates to a method for producing a three-dimensional construction material component 20 which preferably has at least one surface curved in a concave and/or convex manner. A plurality of spacers 32 made of concrete are arranged in a formwork 30. A textile reinforcement 21 is supported on the spacers 32, such that the textile reinforcement 21 has a defined position within a formwork interior 30 of the formwork 30. A tensile force FZ is applied to the textile reinforcement 21 in at least one tension direction Z or in a plurality of tension directions Z via a tensioning device 40. Construction material B is introduced into the formwork interior 30a of the formwork 30 whilst maintaining the tensile force FZ, wherein the construction material B surrounds the textile reinforcement 21. The construction material B is then hardened, wherein the tensile force FZ is maintained during the hardening. During this process, the spacers 32 are integrated into the construction material component 20. The tensioning device 40 has at least one clamping unit 41 for clamping an end portion of the textile reinforcement 21 between two clamping surfaces 56. The clamping surfaces 56 are provided on clamping insert bodies 54, 55, which are produced from a plastic material of defined hardness.

LIST OF REFERENCE SIGNS 20 construction material component
20a one side of the construction material component
20b other side of the construction material component
20c one end of the construction material component
20d other end of the construction material component
21 textile reinforcement
22 model
23 textile strand
24 roving
25 mould part
30 formwork
30a formwork interior of the formwork
31 formwork part
32 spacer
32a underside of the spacer
32b upper side of the spacer
33 group
34 connection element
35 fixing
36 groove
37 fixing arrangement
38 fixing textile strand
40 tensioning device
41 clamping unit
42 filling channel
46 supporting part
47 force-generating device
50 first clamping part
51 second clamping part
52 carrier part
52a plate portion of the carrier part
53 supporting protrusion
54 first clamping insert body
55 second clamping insert body
56 clamping surface
57 groove
58 screw
B construction material
FD compressive force
FZ tensile force
K clamping direction
Q transverse direction
Z tensile direction

The invention claimed is:

1. A method for producing a construction material component (20) having a textile reinforcement (21), said method comprising:
providing a formwork (30) adapted for production of a three-dimensional construction material component (20) having at least one convexly or concavely curved surface, the formwork (30) having at least one formwork part (31) for producing the construction material component (20);
placing spacers (32) in the formwork (30), wherein individual ones of the spacers include a convexly curved upper support surface for supporting a textile reinforcement thereon;
arranging the textile reinforcement (21) produced from at least one textile strand (23) in a lattice-like manner on the convexly curved upper support surface of the spacers (32), wherein the textile reinforcement (21) is a grid having intersecting textile strands that are connected to one another at points of intersection;
applying a tensile force (FZ) to the textile reinforcement (21) with a tensioning device (40) located outside the formwork (30), wherein the textile reinforcement (21), when prestressed by the tensile force (FZ), is non-planar;
pouring a flowable construction material (B) into the formwork (30) around the prestressed textile reinforcement (21) and hardening the construction material (B); and
removing the hardened construction material component (20) from the formwork (30).

2. The method according to claim 1, wherein the spacers (32) are arranged with an underside (32a) of the spacers (32) on a formwork part (31).

3. The method according to claim 1, further comprising casting the spacers (32) into the construction material (B) of the construction material component (20).

4. The method according to claim 1, wherein the spacers (32) form a plurality of groups (33) and the spacers (32) within the same group (33) are connected to one another by a pliable or flexible connection element (34).

5. The method according to claim 1, wherein at least two of the provided spacers (32) are of different sizes.

6. The method according to claim 1, wherein the textile reinforcement (21) includes a plurality of rovings (24), further comprising
saturating the plurality of rovings (24) with a resin, and hardening the textile reinforcement (21).

7. The method according to claim 1, further comprising hardening the textile reinforcement (21) into a predetermined shape and casting the textile reinforcement into the construction material component (20).

8. The method according to claim 1, further comprising preforming and hardening the textile reinforcement (21) and then arranging the textile reinforcement (21) on the spacers (32) and loading with the tensile force (FZ).

9. The method according to claim 1, further comprising arranging the textile reinforcement (21), which is not yet hardened, on the spacers (32), bringing it into the desired shaping, and then hardening and loading it with the tensile force (FZ).

10. The method according to claim 1, further comprising applying the tensile force (FZ) in one or more tension directions (Z).

* * * * *